United States Patent
Mohtashemi et al.

(10) Patent No.: US 11,454,617 B2
(45) Date of Patent: Sep. 27, 2022

(54) METHODS AND SYSTEMS FOR PERFORMING CHROMATOGRAPHIC ALIGNMENT

(71) Applicant: Thermo Finnigan LLC, San Jose, CA (US)

(72) Inventors: Iman Mohtashemi, Mountain House, CA (US); Matthew Kump, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 911 days.

(21) Appl. No.: 16/263,249

(22) Filed: Jan. 31, 2019

(65) Prior Publication Data
US 2020/0249210 A1 Aug. 6, 2020

(51) Int. Cl.
*G01N 30/72* (2006.01)
*G01N 30/86* (2006.01)
(Continued)

(52) U.S. Cl.
CPC ..... *G01N 30/7233* (2013.01); *G01N 30/8631* (2013.01); *G01N 30/8644* (2013.01);
(Continued)

(58) Field of Classification Search
CPC ........... G01N 30/7233; G01N 30/8631; G01N 30/8644; G01N 2030/027;
(Continued)

(56) References Cited

U.S. PATENT DOCUMENTS 5,119,315 A 6/1992 Kemp et al.
5,121,443 A 6/1992 Tomlinson
(Continued)

FOREIGN PATENT DOCUMENTS

EP 1757929 A1 2/2007
WO 2004/049385 A2 6/2004

OTHER PUBLICATIONS

Duran et al., "Metabolomics spectral formatting, alignment and conversion tools (MSFACTs)", Bioinformatics (2003), vol. 19 (17), pp. 2283-2293.
(Continued)

*Primary Examiner* — Jennifer Wecker
*Assistant Examiner* — Michael Paul Shimek

(57) ABSTRACT

An exemplary chromatographic alignment system accesses a target file including data representative of a plurality of chromatographic features detected from a first sample and a reference file including data representative of a plurality of chromatographic features detected from a second sample. The system identifies, based on the target and reference files, a distinct retention time offset value for each chromatographic feature included in a first subset of the plurality of chromatographic features detected from the first sample. The system determines, based on the identified distinct retention time offset values for the chromatographic features included in the first subset and on a machine learning model, a distinct predicted retention time offset value for each chromatographic feature included in a second subset of the plurality of chromatographic features detected from the first sample. The system assigns the distinct predicted retention time offset value for each chromatographic feature included in the second subset.

20 Claims, 9 Drawing Sheets

(51) Int. Cl.
  *G06N 3/02* (2006.01)
  *G01N 30/02* (2006.01)
(52) U.S. Cl.
  CPC ......... *G06N 3/02* (2013.01); *G01N 2030/027* (2013.01); *G01N 2030/8648* (2013.01)
(58) Field of Classification Search
  CPC ....... G01N 2030/8648; G01N 30/8668; G01N 30/86; G01N 30/02; G06N 3/02; G06N 20/20
  See application file for complete search history.

(56) References Cited

U.S. PATENT DOCUMENTS

| | | |
|---|---|---|
| 6,989,100 B2 | 1/2006 | Norton |
| 7,635,433 B2 | 12/2009 | Li |
| 7,680,606 B2 | 3/2010 | Sadygov |
| 8,631,057 B2 | 1/2014 | Du et al. |
| 2016/0141164 A1 | 5/2016 | Kusch |

OTHER PUBLICATIONS

Chilcote et al., "Mathematical Analysis of Normalization Techniques Used in Chromatography", Analytical Chemistry, vol. 45 (4), 1973, pp. 721-724.

Malmquist et al., "Alignment of chromatographic profiles for principal component analysis: a prerequisite for fingerprinting methods", Journal of Chromatography A, vol. 687 (1), 1994, pp. 71-88.

METHODS AND SYSTEMS FOR PERFORMING CHROMATOGRAPHIC ALIGNMENT

BACKGROUND INFORMATION

Chromatography (e.g., liquid chromatography ("LC") or gas chromatography ("GC")) coupled to mass spectrometry ("MS"), such as in LC-MS or GC-MS systems, may be used to detect and identify components within a sample and determine a relative abundance of the components within the sample. LC-MS and GC-MS are frequently used in comparative analytical methods in biology, functional genomics, and biomarker discovery, such as metabolomics, lipidomics, and proteomics research. In these comparative analytical methods, LC-MS or GC-MS enables quantitative comparisons for individual components across multiple samples.

A retention time for a component (e.g., a length of time between sample injection in an LC-MS or GC-MS system and appearance of the relative intensity peak maximum after chromatographic separation) may be different in different samples due to variations in conditions within the LC-MS or GC-MS system, such as temperature, pressure, etc. Accordingly, chromatographic alignment of two samples is performed prior to comparing the abundance of components between the samples.

Existing chromatographic alignment methods are computationally intensive, consume vast amounts of computing resources, and are not scalable for analyses of a large number of samples. Therefore, methods and systems for performing chromatographic alignment with increased performance and speed, reduced processing load, and scalability is needed.

SUMMARY

In some exemplary embodiments, a method includes accessing, by a chromatographic alignment system, a target file including data representative of a plurality of chromatographic features detected from a first sample and a reference file including data representative of a plurality of chromatographic features detected from a second sample. The method further includes identifying, by the chromatographic alignment system based on the target file and the reference file, a distinct retention time offset value for each chromatographic feature included in a first subset of the plurality of chromatographic features detected from the first sample. The method also includes determining, based on the identified distinct retention time offset values for the chromatographic features included in the first subset and based on a machine learning model, a distinct predicted retention time offset value for each chromatographic feature included in a second subset of the plurality of chromatographic features detected from the first sample. The method further includes assigning, by the chromatographic alignment system, the distinct predicted retention time offset value for each chromatographic feature included in the second subset.

In some exemplary embodiments, the determining of the distinct predicted retention time offset value for each chromatographic feature included in the second subset comprises applying data representative of the second subset of the plurality of chromatographic features detected from the first sample as input to a trained neural network that outputs the distinct predicted retention time offset value for each chromatographic feature included in the second subset.

In some exemplary embodiments, during a training phase of the chromatographic alignment system, the method further includes accessing, by the chromatographic alignment system, the identified distinct retention time offset value for each chromatographic feature included in the first subset, and training, by the chromatographic alignment system, the machine learning model based on the identified distinct retention time offset value for each chromatographic feature included in the first subset.

In some exemplary embodiments, the identifying of the distinct retention time offset value for each of the first subset of the plurality of chromatographic features detected from the first sample includes matching, by the chromatographic alignment system, chromatographic features included in the first subset with the plurality of chromatographic features detected from the second sample, and identifying, by the chromatographic alignment system based on the matching, the distinct retention time offset value for each chromatographic feature included in the first subset of the plurality of chromatographic features detected from the first sample.

In some exemplary embodiments, the method further includes dividing, by the chromatographic alignment system based on a threshold value, the plurality of chromatographic features detected from the first sample into the first subset and the second subset. Each chromatographic feature included in the first subset has an intensity value greater than or equal to the threshold value. Each chromatographic feature included in the second subset has an intensity value less than the threshold value.

In some exemplary embodiments, the method further includes selecting, by the chromatographic alignment system based on intensity values for the chromatographic features included in the first subset, the threshold value.

In some exemplary embodiments, the method further includes dividing, by the chromatographic alignment system based on a random selection of chromatographic features, the plurality of chromatographic features detected from the first sample into the first subset and the second subset.

In some exemplary embodiments, the method further includes assigning, by the chromatographic alignment system based on the identified distinct retention time offset value for each chromatographic feature included in the first subset and the distinct predicted retention time offset value for each chromatographic feature included in the second subset, retention times of the plurality of chromatographic features detected from the first sample.

In some exemplary embodiments, a system include at least one memory storing instructions; and at least one processor communicatively coupled to the at least one memory and configured to execute the instructions to: access a target file including data representative of a plurality of chromatographic features detected from a first sample and a reference file including data representative of a plurality of chromatographic features detected from a second sample, identify, based on the target file and the reference file, a distinct retention time offset value for each chromatographic feature included in a first subset of the plurality of chromatographic features detected from the first sample, determine, based on the identified distinct retention time offset values for the chromatographic features included in the first subset and based on a machine learning model, a distinct predicted retention time offset value for each chromatographic feature included in a second subset of the plurality of chromatographic features detected from the first sample, and assign the distinct predicted retention time offset value for each chromatographic feature included in the second subset.

In some exemplary embodiments, the determination of the distinct predicted retention time offset value for each chromatographic feature included in the second subset comprises applying data representative of the second subset of the plurality of chromatographic features detected from the first sample as input to a trained neural network that outputs the distinct predicted retention time offset value for each chromatographic feature included in the second subset.

In some exemplary embodiments, during a training phase, the at least one processor is further configured to: access the identified distinct retention time offset value for each chromatographic feature included in the first subset, and train the machine learning model based on the identified distinct retention time offset value for each chromatographic feature included in the first subset.

In some exemplary embodiments, the identifying of the distinct retention time offset value for each of the first subset of the plurality of chromatographic features detected from the first sample includes matching chromatographic features included in the first subset with the plurality of chromatographic features detected from the second sample, and identifying, based on the matching, the distinct retention time offset value for each chromatographic feature included in the first subset of the plurality of chromatographic features detected from the first sample.

In some exemplary embodiments, the at least one processor is further configured to: divide, based on a threshold value, the plurality of chromatographic features detected from the first sample into the first subset and the second subset. Each chromatographic feature included in the first subset has an intensity value greater than or equal to the threshold value. Each chromatographic feature included in the second subset has an intensity value less than the threshold value.

In some exemplary embodiments, the at least one processor is further configured to: select, based on intensity values for the chromatographic features included in the first subset, the threshold value.

In some exemplary embodiments, the at least one processor is further configured to: divide, based on a random selection of chromatographic features, the plurality of chromatographic features detected from the first sample into the first subset and the second subset In some exemplary embodiments, the at least one processor is further configured to: assign, based on the identified distinct retention time offset value for each chromatographic feature included in the first subset and the distinct predicted retention time offset value for each chromatographic feature included in the second subset, retention times of the plurality of chromatographic features detected from the first sample.

In some exemplary embodiments, a non-transitory computer-readable medium storing instructions that, when executed, direct at least one processor of a computing device to: access a target file including data representative of a plurality of chromatographic features detected from a first sample and a reference file including data representative of a plurality of chromatographic features detected from a second sample, identify, based on the target file and the reference file, a distinct retention time offset value for each chromatographic feature included in a first subset of the plurality of chromatographic features detected from the first sample, determine, based on the identified distinct retention time offset values for the chromatographic features included in the first subset and based on a machine learning model, a distinct predicted retention time offset value for each chromatographic feature included in a second subset of the plurality of chromatographic features detected from the first sample, and assign the distinct predicted retention time offset value for each chromatographic feature included in the second subset.

In some exemplary embodiments, the determination of the distinct predicted retention time offset value for each chromatographic feature included in the second subset comprises applying data representative of the second subset of the plurality of chromatographic features detected from the first sample as input to a trained neural network that outputs the distinct predicted retention time offset value for each chromatographic feature included in the second subset.

In some exemplary embodiments, computer-readable medium of claim 15, wherein, during a training phase of the system, the instructions, when executed, direct the at least one processor of the computing device to: access the identified distinct retention time offset value for each chromatographic feature included in the first subset, and train the machine learning model based on the identified distinct retention time offset value for each chromatographic feature included in the first subset.

In some exemplary embodiments, the identified distinct retention time offset value for each of the first subset of the plurality of chromatographic features detected from the first sample includes: matching chromatographic features included in the first subset with the plurality of chromatographic features detected from the second sample, and identifying, based on the matching, the distinct retention time offset value for each chromatographic feature included in the first subset of the plurality of chromatographic features detected from the first sample.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
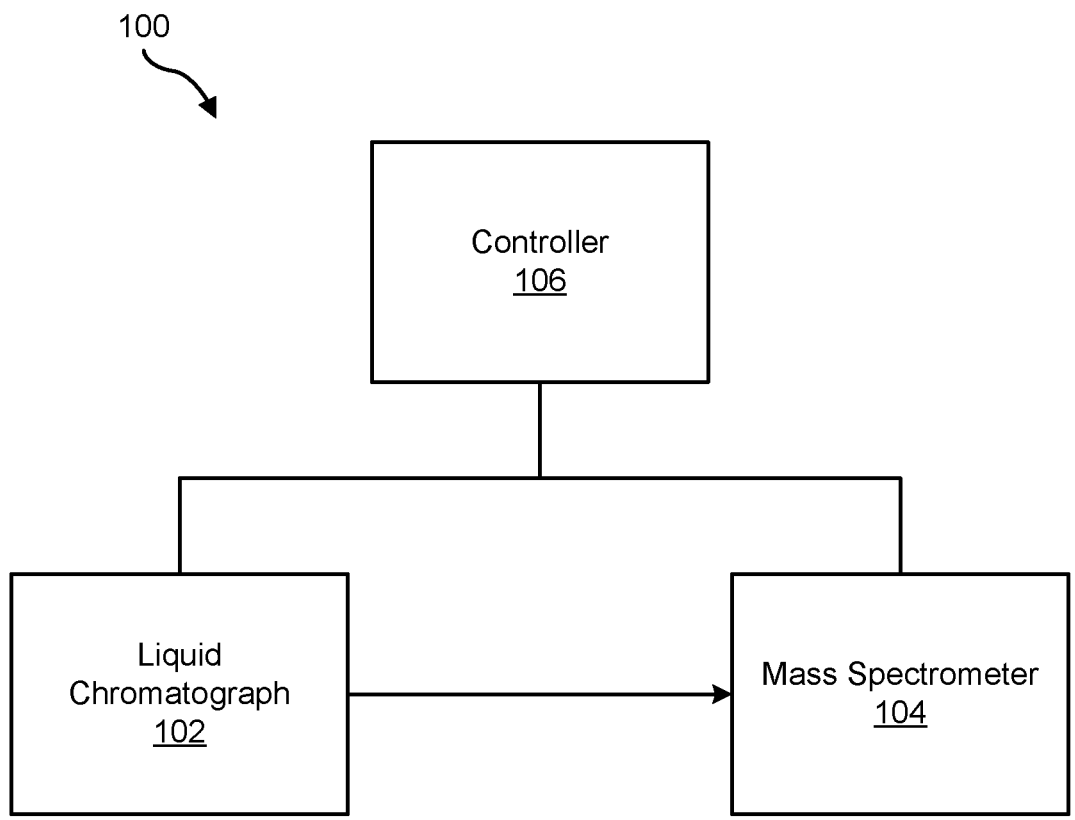
FIG. 1 illustrates an exemplary liquid chromatography-mass spectrometry system according to principles described herein.

Methods and systems for performing chromatographic alignment are described herein. In an example, a chromatographic alignment system may access a target file including data representative of a plurality of chromatographic features detected from a first sample, and a reference file including data representative of a plurality of chromatographic features detected from a second sample. Based on the target file and the reference file, the chromatographic alignment system may identify a distinct retention time offset value for each chromatographic feature included in a first subset of the plurality of chromatographic features detected from the first sample. In an example, each chromatographic feature included in the first subset has an intensity value greater than or equal to a threshold value.

Based on the identified distinct retention time offset values for the chromatographic features included in the first subset and based on a machine learning model, a distinct predicted retention time offset value for each chromatographic feature included in a second subset of the plurality of chromatographic features detected from the first sample is determined. Each chromatographic feature included in the second subset has an intensity value less than the threshold value. The chromatographic alignment system assigns the distinct predicted retention time offset value for each chromatographic feature included in the second subset. In certain examples, the distinct predicted retention time offset value for each chromatographic feature may be utilized to provide chromatographic alignment between chromatographic features detected from the first sample and chromatographic features detected from another sample.

Methods and systems described herein for performing chromatographic alignment may provide various benefits, which may include one or more advantages over conventional chromatographic alignment systems and methods. For example, the chromatographic alignment systems and methods described herein may identify and predict distinct retention time offset values with reduced processing time, reduced computing resource usage, and increased scalability as compared to conventional chromatographic alignment systems and methods. These and other advantages will be described herein.

Various embodiments will now be described in more detail with reference to the figures. The systems and methods described herein may provide one or more of the benefits mentioned above and/or various additional and/or alternative benefits that will be made apparent herein.

In some implementations, chromatographic alignment systems and methods may be used in conjunction with an LC-MS system. As such, an exemplary LC-MS system will now be described. The described exemplary LC-MS system is illustrative and not limiting. The systems and methods described may operate as part of or in conjunction with the LC-MS system described herein and/or with other suitable chromatography-mass spectrometry systems, including high-performance liquid chromatography-mass spectrometry (HPLC-MS) and gas chromatography-mass spectrometry (GC-MS).

FIG. 1 illustrates an exemplary liquid chromatography-mass spectrometry system 100 ("LC-MS system 100"). As shown, LC-MS system 100 includes a liquid chromatograph 102, a mass spectrometer 104, and a controller 106. LC-MS system 100 may be configured to separate components within a sample injected into LC-MS system 100 and determine a relative abundance of the components within the sample. In certain examples, a sample may include multiple biological components (e.g., metabolites, proteins, lipids, etc.) or chemical components (e.g., molecules, ions, etc.) for detection by LC-MS system 100.

Liquid chromatograph 102 is configured to separate certain components within the sample over time and detect a relative abundance of the separated components. Liquid chromatograph 102 may be implemented by any suitable type of liquid chromatograph as may suit a particular implementation. For example, in liquid chromatograph 102 the sample may be injected into a mobile phase (e.g., a solvent), which carries the sample through a column containing a stationary phase (e.g., an adsorbent packing material). As the mobile phase passes through the column, components within the sample elute from the column at different times based on, for example, their size, their affinity to the stationary phase, their polarity, and/or their hydrophobicity. A detector (e.g., a spectrophotometer) then measures the relative intensity of a signal modulated by each separated component (eluite) in the eluate from the column. Data generated by the detector may be represented as a chromatograph, which plots retention time on the x-axis and a signal representative of the relative intensity on the y-axis. The retention time of a component is generally measured as the period of time between injection of the sample into the mobile phase and the appearance, on the chromatograph, of the relative intensity peak maximum after chromatographic separation. In some examples the relative intensity may be correlated to or representative of relative abundance of the separated components. Data generated by liquid chromatograph 102 may be output to controller 106.

In some cases, particularly in analyses of complex mixtures, multiple different components may elute from the column at approximately the same time, and thus may have the same or similar retention times. As a result, determination of the relative intensity of the individual components within the sample requires further separation of the individual components. To this end, liquid chromatograph 102 delivers the eluites to mass spectrometer 104.

Mass spectrometer 104 is configured to separate the individual components based on a ratio of mass to charge (m/z) of each of the components and measure the relative abundance of the individual components. Mass spectrometer 104 may be implemented by any suitable mass spectrometer as may suit a particular implementation. For example, mass spectrometer 104 may ionize the eluites received from liquid chromatograph 102 and sort or separate the ions based on m/z. A detector in mass spectrometer 104 then measures the relative intensity of a signal modulated by each detected ion. Data generated by the detector may be displayed in the form of a mass spectrum, which plots m/z on the x-axis and relative intensity on the y-axis. In some examples the relative intensity may be correlated to or representative of relative abundance of the detected ions. Data generated by mass spectrometer 104 may be output to controller 106.

Controller 106 may be communicatively coupled with, and configured to control operations of, LC-MS system 100 (e.g., liquid chromatograph 102 and mass spectrometer 104). Controller 106 may include hardware (e.g., a processor, circuitry, etc.) and/or software configured to control operations of the various components of LC-MS system 100. Controller 106 may be configured to receive LC-MS raw data (e.g., chromatograph data from liquid chromatograph 102 and mass spectrum data from mass spectrometer 104), which may be combined and represented in three-dimensions as a feature map. In a feature map, retention time may be plotted along the x-axis, m/z may be plotted along the y-axis, and relative intensity may be plotted along the z-axis. Spectral features on the feature map (e.g., peaks of relative intensity) represent detection by LC-MS system 100 of various components included within an analyzed sample.

Since the feature map typically contains many signal representations of the same molecular species, a component detection process may be performed (e.g., by controller 106 or another computing device) to reduce and/or combine the many spectral features in the LC-MS raw data to a smaller number of component features. The reduced LC-MS data may also be represented as a feature map. A component feature refers to a relative intensity peak on the reduced feature map and is representative of an individual component within the analyzed sample. Thus, a particular component feature has a unique combination of retention time and m/z values. And as explained above, the relative intensity for the component feature may be indicative of a relative abundance of the component within the sample.

The x- and z-axes of the reduced LC-MS data represent a mass chromatograph which plots relative intensity as a function of retention time. As used herein, a chromatographic feature refers to a distinct peak of relative intensity on a mass chromatograph. The y- and z-axes of the reduced LC-MS data represent a mass spectrum that plots relative intensity as a function of m/z. As used herein, a "file" may refer to the reduced LC-MS data generated from a unique sample analysis (experiment) by an LC-MS system (e.g., LC-MS system 100).

In differential profiling methods in biology, functional genomics, and biomarker discovery, researchers may desire to compare the molecular signatures of multiple different populations of people. For example, a researcher may desire to compare the relative abundance of a particular component in a first sample (e.g., a sample taken from a first individual) with the relative abundance of the same component in a second sample (e.g., a sample taken from a second individual). However, given that each file represents a unique experimental analysis of a sample, variations in the experiment conditions (e.g., column packing materials, temperature, pressure, column age, etc.) results in variations in retention time, even for the same component. Accordingly, before a comparison of two files can be performed, chromatographic features of both files must be aligned by a chromatographic alignment process to ensure that only the same components (e.g., molecular species) in both files are compared, i.e., to ensure an apples-to-apples comparison.

Various algorithms for chromatographic alignment exist, such as time warping and direct matching. However, time warping does not work well where signal density is low, such as in metabolomics and small molecules (e.g., molecules having a mass less than about 500 Da), so there may be insufficient discrimination between signals. In direct matching, chromatographic features in the target file and the reference file are matched to one another based on various similarity algorithms. However, owing to the large numbers of component features in files, direct matching is computationally intensive and consumes vast amounts of processing power, and therefore is not easily scalable.

As will be explained below in more detail, the chromatographic alignment systems and methods described herein overcome the deficiencies of existing chromatographic alignment methods by determining retention time offset values for a first subset of chromatographic features (e.g., chromatographic features having a relative intensity that equals or exceeds a predetermined threshold value) for a target file relative to a reference file. Based on the determined retention time offset values for the first subset of chromatographic features, the systems and methods described herein predict retention time offset values for a second subset of chromatographic features (e.g., chromatographic features having a relative intensity less than the predetermined threshold value). This method significantly reduces processing load on a computing device and increases the speed of performing chromatographic alignment, all of which make the systems and methods described herein scalable for large quantities of files. Exemplary chromatographic alignment systems and methods will now be described.

Figure 2:
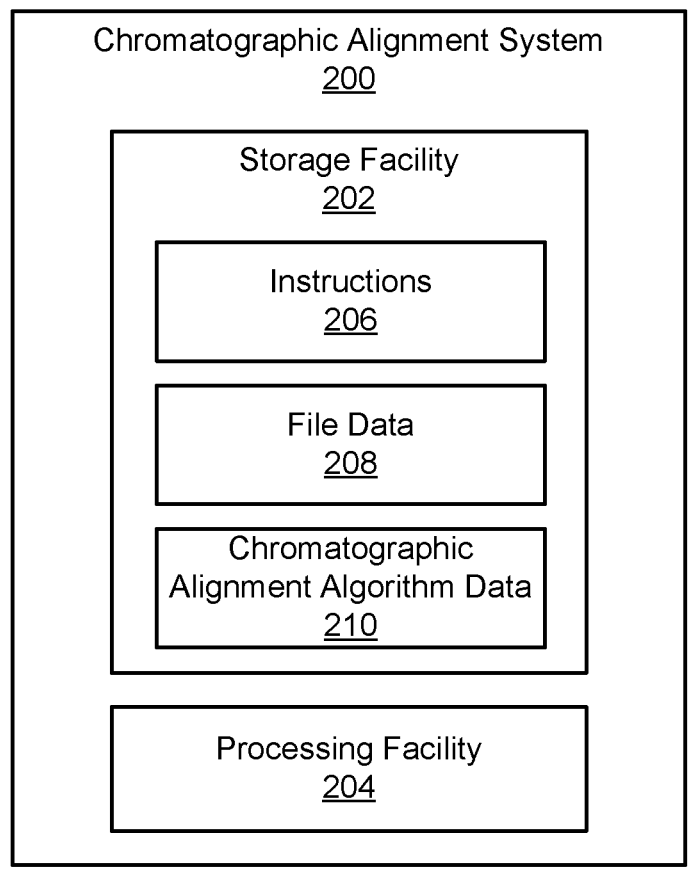
FIG. 2 illustrates an exemplary chromatographic alignment system according to principles described herein.

FIG. 2 illustrates an exemplary chromatographic alignment system 200 ("system 200"). As shown, system 200 may include, without limitation, a storage facility 202 and a processing facility 204 selectively and communicatively coupled to one another. Facilities 202 and 204 may each include or be implemented by hardware and/or software components (e.g., processors, memories, communication interfaces, instructions stored in memory for execution by the processors, etc.). In some examples, facilities 202 and 204 may be distributed between multiple devices and/or multiple locations as may serve a particular implementation.

Storage facility 202 may maintain (e.g., store) executable data used by processing facility 204 to perform any of the operations described herein. For example, storage facility 202 may store instructions 206 that may be executed by processing facility 204 to perform any of the operations described herein. Instructions 206 may be implemented by any suitable application, software, code, and/or other executable data instance.

Storage facility 202 may also maintain any data received, generated, managed, used, and/or transmitted by processing facility 204. For example, as shown, storage facility 202 may maintain file data 208 and chromatographic alignment algorithm data 210.

File data 208 may include data representative of one or more files. As explained above, each file contains reduced LC-MS feature map data generated from a unique sample analysis by an LC-MS system (e.g., LC-MS system 100). Accordingly, each file includes data representative of a plurality of chromatographic features for a particular sample. The data may indicate a relative intensity value and a retention time value for each chromatographic feature. Chromatographs representative of an exemplary target file and an exemplary reference file will be described herein.

Chromatographic alignment algorithm data 210 may include data representative of, used by, or associated with one or more algorithms maintained by processing facility 204 for performing chromatographic alignment of a target file and a reference file. For example, chromatographic alignment algorithm data 210 may include data representative of a peak matching algorithm and one or more machine learning models. In an example, the peak matching algorithm may be utilized to identify retention time offset values for any suitable number of chromatographic features that have been detected for a target sample. For example, the peak matching algorithm may direct processing facility 204 to perform peak matching between chromatographic features of the target file and chromatographic features of the reference file to identify retention time offset values for the chromatographic features of the target file. Retention time offset values may be used to correct the chromatographic features of the target file so the chromatographic features can be reliably compared with chromatographic features of the reference file.

A machine learning model may include data representative of a machine learning model configured to predict a retention time offset value for any suitable number of chromatographic features in the target file. For example, the machine learning model may be utilized by processing facility 204 to build a non-linear regression model to fit the retention time offset values identified, by the peak detection algorithm, for chromatographic features of the target file. The machine learning model may then use the non-linear regression model to predict retention time offset values for the remaining chromatographic features of the target file.

Processing facility 204 may be configured to perform (e.g., execute instructions 206 stored in storage facility 202 to perform) various processing operations associated with performing chromatographic alignment. For example, processing facility 204 may access a target file including data representative of a plurality of chromatographic features detected from a first sample, and a reference file including data representative of a plurality of chromatographic features detected from a second sample. Based on the target file and the reference file, processing facility 204 may identify a distinct retention time offset value for each chromatographic feature included in a first subset of the plurality of chromatographic features detected from the first sample. Based on the identified distinct retention time offset values for the chromatographic features included in the first subset and based on a machine learning model, processing facility 204 may determine a distinct predicted retention time offset value for each chromatographic feature included in a second subset of the plurality of chromatographic features detected from the first sample. Processing facility 204 may assign the distinct predicted retention time offset value for each chromatographic feature included in the second subset. In certain examples, based on the distinct predicted retention time offset value for each chromatographic feature, processing facility 204 may perform chromatographic alignment between chromatographic features detected from the first sample and chromatographic features detected from another sample. These and other operations that may be performed by processing facility 204 are described herein.

In some examples, system 200 may be implemented entirely or in part by LC-MS system 100 (e.g., by controller 106). Alternatively, system 200 may be implemented separately from LC-MS system 100.

Figure 3:
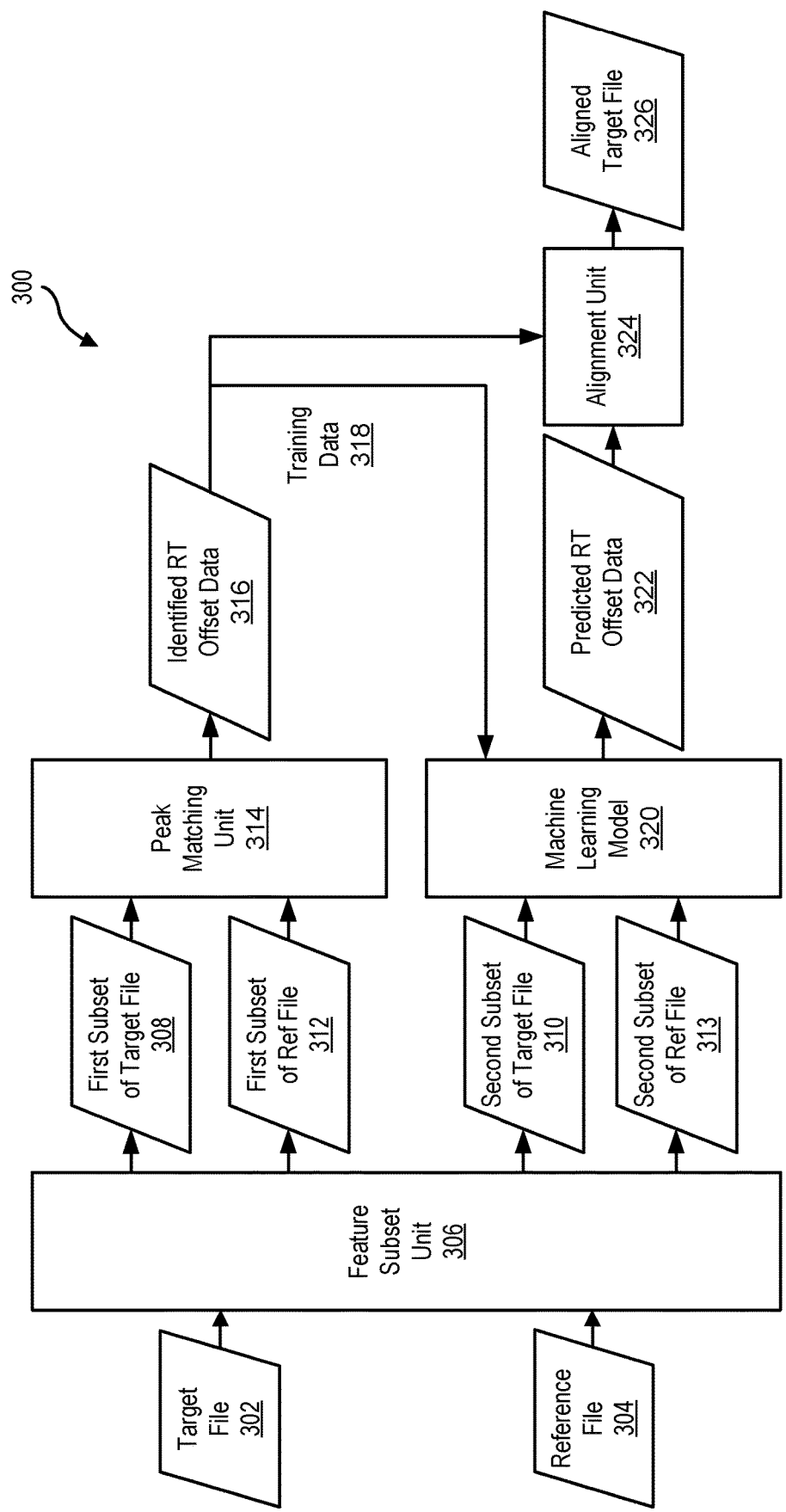
FIG. 3 illustrates an exemplary configuration of a workflow for performing chromatographic alignment of files by the chromatographic alignment system of FIG. 2 according to principles described herein.

FIG. 3 illustrates an exemplary workflow 300 of system 200 (e.g., processing facility 204) for performing chromatographic alignment of chromatographic features of a target file 302 and chromatographic features of a reference file 304. System 200 may access target file 302 and reference file 304 in any suitable manner and from any suitable source. In some examples, system 200 may access target file 302 and reference file 304 from storage facility 202 of system 200 or from LC-MS system 100. Target file 302 includes data representative of a plurality of chromatographic features detected by an LC-MS system (e.g., LC-MS system 100) from a first sample, and reference file 304 includes data representative of a plurality of chromatographic features detected by an LC-MS system (e.g., LC-MS system 100) from a second sample.

System 200 may apply target file 302 and reference file 304 as inputs to feature subset unit 306. Feature subset unit 306 may divide data representative of the chromatographic features of target file 302 into a first subset 308 of chromatographic features and a second subset 310 of chromatographic features, which will be processed differently. Similarly, feature subset unit 306 may divide data representative of the chromatographic features of reference file 304 into a first subset 312 of chromatographic features and a second subset 313 of chromatographic features, which will also be processed differently.

Feature subset unit 306 may perform any suitable heuristic, process, and/or operation that may be performed or executed by system 200 and that may be configured to divide target file 302 and reference file 304 into first and second subsets. In some examples, feature subset unit 306 may be implemented by hardware and/or software components (e.g., processors, memories, communication interfaces, instructions stored in memory for execution by the processors, etc.), such as storage facility 202 and/or processing facility 204 of system 200.

First subset 308 of target file 302 may include the chromatographic features having relative intensity values greater than or equal to a first threshold value, and second subset 310 of target file 302 may include the chromatographic features with relative intensity values less than the first threshold value. In some examples, the first threshold value may be a predetermined threshold value determined prior to system 200 accessing target file 302. Alternatively, the first threshold value may be determined by feature subset unit 306 based on the relative intensity values for the chromatographic features within target file 302.

Figure 4:
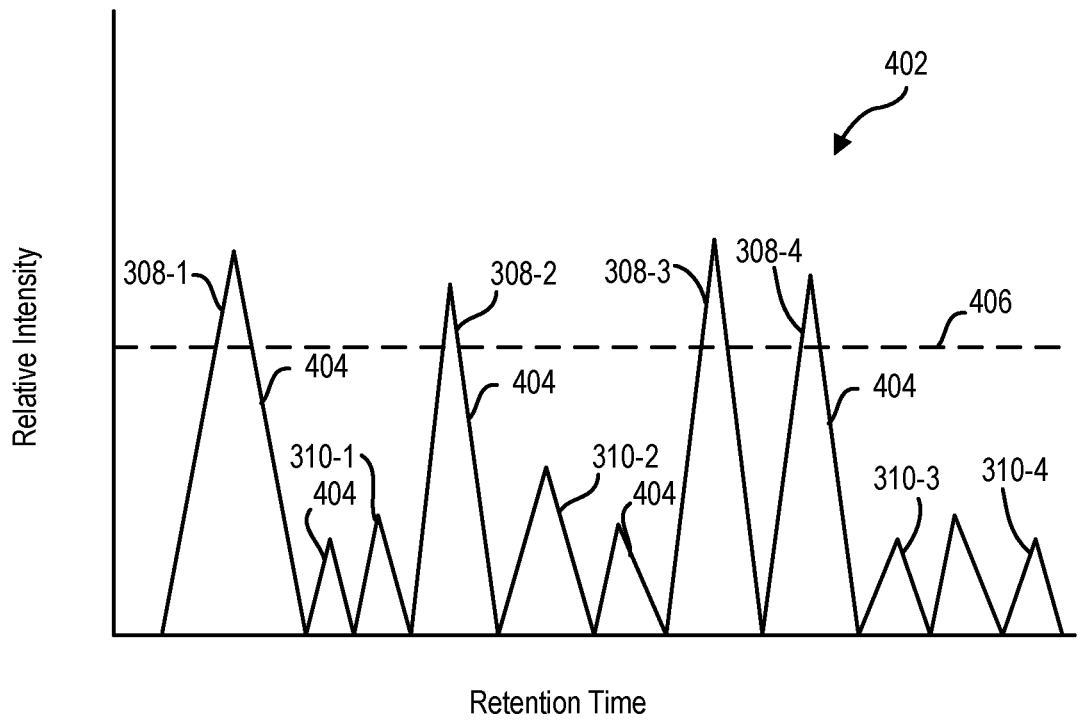
FIG. 4 illustrates an exemplary chromatograph for a first sample according to principles described herein.

Dividing of target file 302 into first subset 308 and second subset 310 will now be described with reference to FIG. 4. FIG. 4 illustrates an exemplary chromatograph 402 representative of data included in target file 302. As shown, chromatograph 402 includes a plurality of chromatographic features 404 representative of components detected in the first sample. Chromatograph 402 may include additional or fewer chromatographic features 404 than shown in FIG. 4 without varying from the scope of this disclosure. Feature subset unit 306 may divide, based on a threshold value 406, chromatographic features 404 into a first subset 308 of chromatographic features (e.g., chromatographic features 308-1, 308-2, 308-3, and 308-4) and a second subset 310 of chromatographic features (e.g., chromatographic features 310-1, 310-2, 310-3, 310-4, etc.).

Threshold value 406 may be set in any suitable way as described herein. In some examples, threshold value 406 may be set as a particular percentage (e.g., 75%) of a maximum relative intensity value among all chromatographic features 404. Alternatively, threshold value 406 may be predetermined as a particular relative intensity value. As shown in FIG. 4, dividing chromatographic features 404 into two subsets based on threshold value 406 may result in substantially fewer chromatographic features 404 being included in the first subset 308 than in the second subset 310.

Referring back to FIG. 3, feature subset unit 306 may divide data representative of the chromatographic features of reference file 304 to generate a first subset 312 and a second subset 313 of chromatographic features detected from the second sample. In some examples, first subset 312 may include the chromatographic features having intensity values greater than or equal to a second threshold value, and second subset 313 may include the chromatographic features having intensity values less than the second threshold value. In some examples, the second threshold value may be a predetermined threshold value determined prior to system 200 accessing reference file 304. Alternatively, the second threshold value may be determined by feature subset unit 306 based on the relative intensity values for the chromatographic features within reference file 304.

Figure 5:
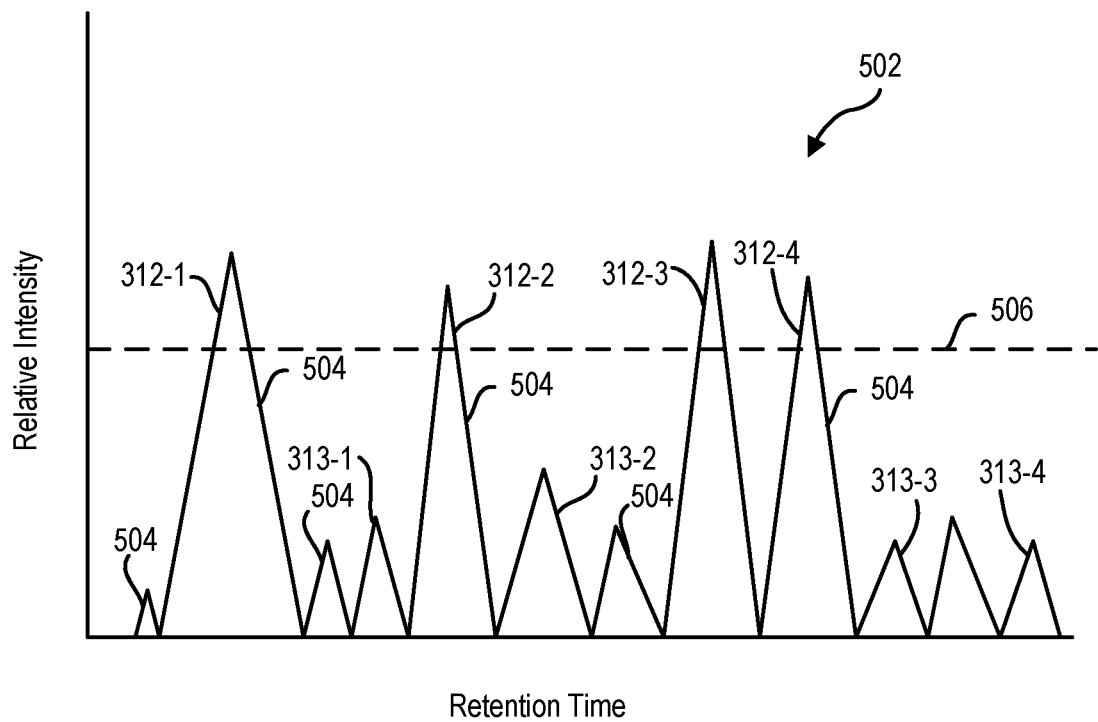
FIG. 5 illustrates an exemplary chromatograph for a second sample according to principles described herein.

Dividing of reference file 304 into first subset 312 and second subset 313 will now be described with reference to FIG. 5. FIG. 5 illustrates an exemplary chromatograph 502 representative of data included in reference file 304. As shown, chromatograph 502 includes a plurality of chromatographic features 504 representative of components detected in the second sample. Chromatograph 502 may include additional or fewer chromatographic features 504 than shown in FIG. 5 without varying from the scope of this disclosure. Feature subset unit 306 may divide, based on a threshold value 506, chromatographic features 504 into a first subset 312 of chromatographic features (e.g., chromatographic features 312-1, 312-2, 312-3, and 312-4) and a second subset 313 of chromatographic features (e.g., chromatographic features 313-1, 313-2, 313-3, 313-4, etc.).

Threshold value 506 may be set in any suitable way as described herein. In some examples, threshold value 506 may be set as a particular percentage (e.g., 75%) of a maximum relative intensity value among all chromatographic features 504. Alternatively, threshold value 506 may be predetermined as a particular relative intensity value. Alternatively, threshold value 506 may be set equal to threshold value 406 (or vice versa). As shown in FIG. 5, dividing chromatographic features 504 into two subsets based on threshold value 506 may result in substantially fewer chromatographic features being in the first subset 312 than in the second subset 313.

Referring back to FIG. 3, system 200 may apply first subset 308 of target file 302 and first subset 312 of reference file 304 as inputs to a peak matching unit 314. Peak matching unit 314 may perform any suitable heuristic, process, and/or operation that may be performed or executed by system 200 and that may be configured to perform peak matching of the chromatographic features of first subset 308 of target file 302 with the chromatographic features of first subset 312 of reference file 304. In some examples, peak matching unit 314 may be implemented by hardware and/or software components (e.g., processors, memories, communication interfaces, instructions stored in memory for execution by the processors, etc.), such as chromatographic storage facility 202 (e.g., alignment algorithm data 210) and/or processing facility 204 of system 200.

Peak matching unit 314 may apply a peak matching algorithm to perform peak matching of the chromatographic features of first subset 308 of target file 302 and the chromatographic features of first subset 312 of reference file 304. In some examples, the peak matching algorithm may be configured to match one or more of the chromatographic features of first subset 308 with a corresponding chromatographic feature of second subset 312 (i.e., with a chromatographic feature of second subset 312 that represents the same component as the chromatographic feature of first subset 308). Peak matching unit 314 may perform peak matching in any suitable way and using any suitable algorithm(s). For example, peak matching unit 314 may compute similarity of chromatographic features by using normalized weighted absolute difference, cosine similarity, Euclidean distance, and Mahalanobis distance. Additionally, after similarity has been computed, peak matching unit 314 may employ, for example, a greedy or combinatorial matching method.

Figure 6:
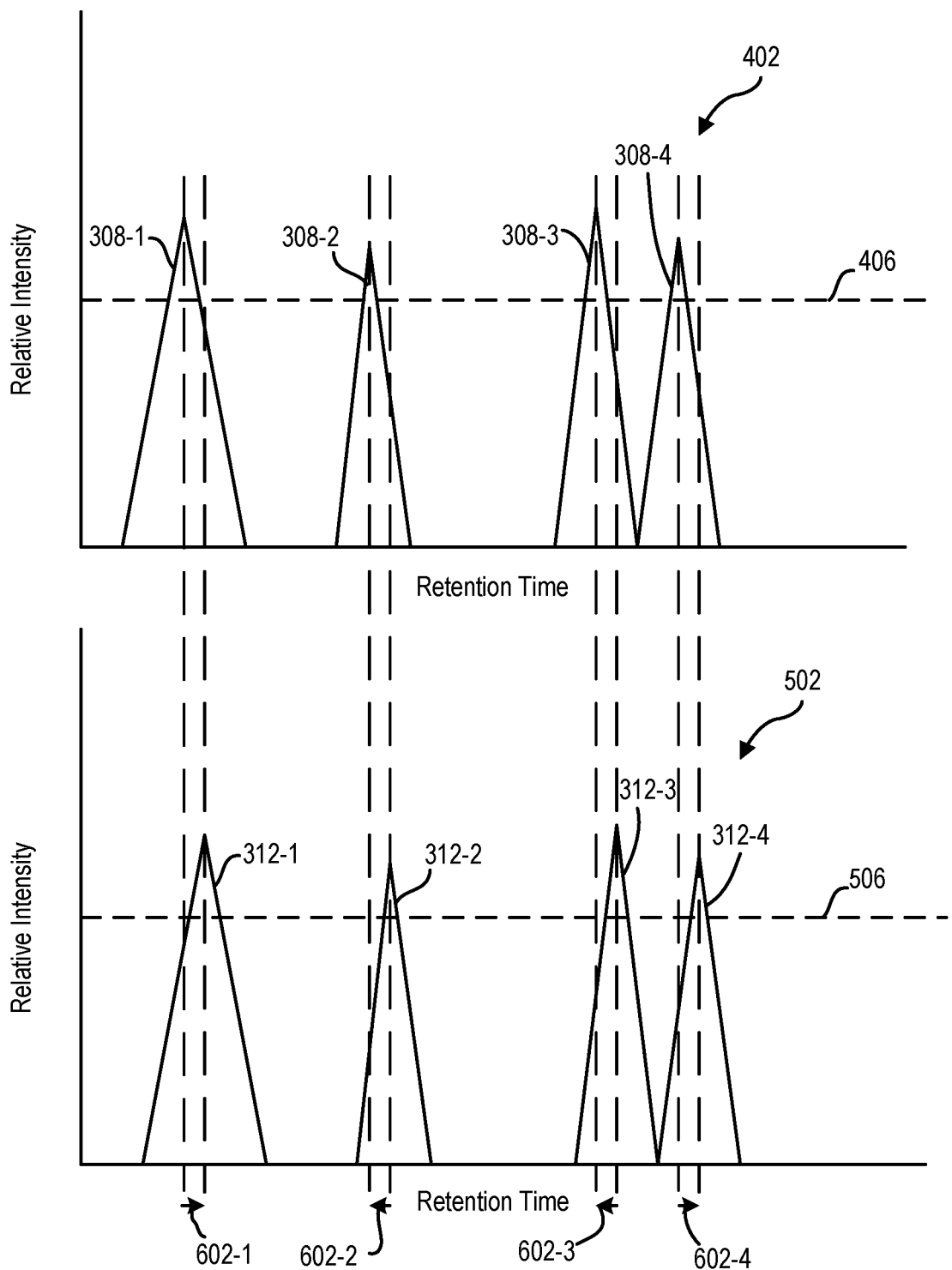
FIG. 6 illustrates an exemplary peak matching between chromatographic features for a target file and chromatographic features for a reference file according to principles described herein.

After chromatographic features have been matched, peak matching unit 314 may identify distinct retention time offset values for the chromatographic features of first subset 308 of target file 302. FIG. 6 illustrates a manner of performing peak matching and identifying distinct retention time offset values for the chromatographic features of first subset 308 of target file 302. FIG. 6 shows chromatograph 402 including chromatographic features 308-1, 308-2, 308-3, and 308-4 included in first subset 308, and chromatograph 502 including chromatographic features 312-1, 312-2, 312-3, and 312-4 included in first subset 312. Peak matching unit 314 may determine that chromatographic features 308-1 and 312-1 correspond to the same component, chromatographic features 308-2 and 312-2 correspond to the same component, chromatographic features 308-3 and 312-3 correspond to the same component, and chromatographic features 308-4 and feature 312-4 correspond to the same component.

Based on the peak matching of features included in first subset 308 and first subset 312, peak matching unit 314 may identify a distinct retention time offset value 602 (e.g., retention time offset values 602-1, 602-2, 602-3, and 602-4) for each chromatographic feature of subset 308 of target file 302 (e.g., chromatographic features 308-1, 308-2, 308-3, and 308-4). For example, peak matching unit 314 may perform peak matching to compare retention times of chromatographic features 308-1, 308-2, 308-3, and 308-4 to retention times of chromatographic features 312-1, 312-2, 312-3, and 312-4 of reference file 304. Based on the comparison, peak matching unit 314 may identify a distinct retention time offset value 602 for each chromatographic feature of subset 308-1 (e.g., retention time offset value 602-1 for chromatographic feature 308-1, retention time offset value 602-2 for chromatographic feature 308-2, retention time offset value 602-3 for chromatographic feature 308-3, and retention time offset value 602-4 for chromatographic feature 308-4).

As shown in FIG. 6, chromatographic feature 308-1 of target file 302 may have a retention time that is less than the retention time of chromatographic feature 312-1 of reference file 304. Based on the difference between the retention times of chromatographic feature 308-1 and 312-1, system 200 may identify a retention time offset value 602-1 for chromatographic feature 308-1. System 200 may compare chromatographic feature 308-2 of file 302 and chromatographic feature 312-2 in substantially the same manner to identify a retention time offset value 602-2 for chromatographic feature 308-2. Similarly, system 200 may compare chromatographic feature 308-3 and chromatographic feature 312-3 in substantially the same manner to identify a retention time offset value 602-3 for chromatographic feature 308-3, and compare chromatographic feature 308-4 and chromatographic feature 312-4 in substantially the same manner to identify a retention time offset value 602-4 for chromatographic feature 308-4.

The identified retention time offset values 602-1 to 602-4 may be used to predict a distinct retention time offset value for each chromatographic feature included in second subset 310 of target file 302. However, as shown in FIG. 6, retention time offset values 602-1, 602-2, 602-3, and 602-4 may be non-linear, such that a direction of the retention time offset, and/or the amount of offset may not have a linear relationship from one chromatographic feature to the next. Thus, as will be explained in more detail, system 200 may use a machine learning model to predict the distinct retention time offset value for each chromatographic feature included in second subset 310 of target file 302.

Referring back to FIG. 3, peak matching unit 314 may output a set of identified distinct retention time offset values 316 for the chromatographic features included in first subset 308. System 200 may then apply the set of identified distinct retention time offset values 316 as training data 318 to a machine learning model 320, as will be described below. System 200 may utilize training data 318 to train machine learning model 320 to predict retention time offset values for the second subset 310 of chromatographic features within target file 302.

Figure 7:
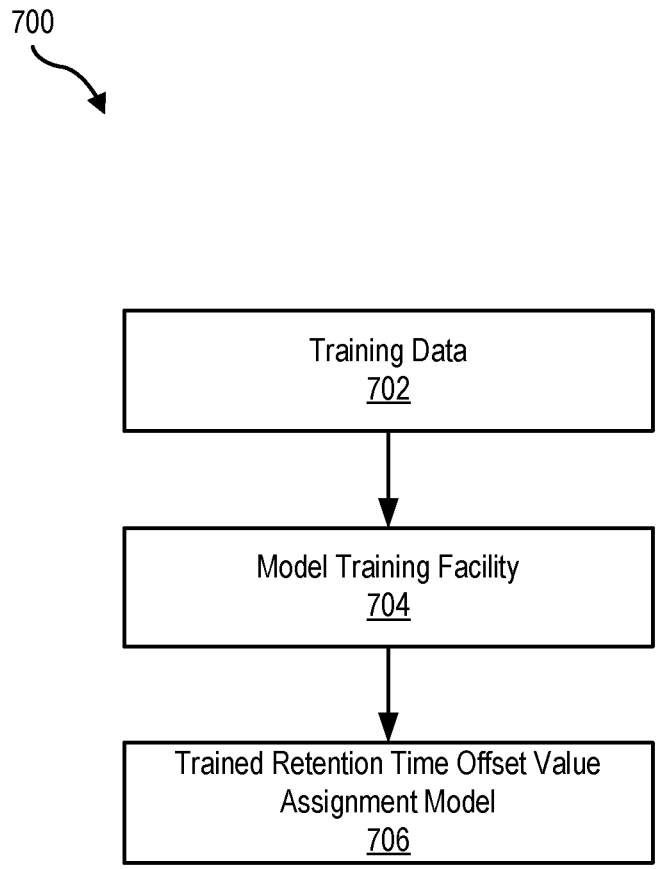
FIG. 7 illustrates an exemplary manner for training a machine learning model to predict retention time offset values for chromatographic features detected for a sample according to principles described herein.

FIG. 7 illustrates a method 700 for training machine learning model 320. As shown, training data 702 (e.g., training data 318) may be provided to a model training facility 704, which may utilize the training data 702 to train a machine learning model in any suitable manner. Model training facility 704 may use training data 702 to train one or more machine learning models to predict a retention time offset value for each chromatographic feature in target file 302. Model training facility 704 may perform any suitable heuristic, process, and/or operation that may be performed or executed by system 200 and that may be configured to train a machine learning model. In some examples, model training facility 704 may be implemented by hardware and/or software components (e.g., processors, memories, communication interfaces, instructions stored in memory for execution by the processors, etc.), such as storage facility 202 and/or processing facility 204 of system 200.

Training data 702 may include data representative of distinct retention time offset values for a plurality of chromatographic features included in first subset 308 of chromatographic features of target file 302 (e.g., the set of identified distinct retention time offset values 316). In some examples, training data 702 may be split into two sets of data, such that a first set of data may be used for training machine learning model and a second set of data may be used to score the machine learning model, as will be described herein. For example, training data 702 may be split so that a first percentage (e.g., 75%) of the retention time offset values may be used as the training set for training the machine learning model, and a second percentage (e.g., 25%) of the retention time offset values may be used as the scoring set to generate an accuracy score for the machine learning model.

In an example, model training facility 704 may train the machine learning model to determine retention time offset values based on the first set of data. For example, the model training facility 704 may build, using any suitable machine learning process, a machine learning model to fit the distinct retention time offset values 602 represented by training data 318.

During a training phase, model training facility 704 may run one or more sessions to facilitate training of the machine learning model based on training data 702. In some examples, model training facility 704 may access and use the first set of training data 702 to train the machine learning model to determine and assign distinct retention time offset values to each chromatographic feature in a target file. For example, during the training phase, model training facility 704 may use any suitable machine learning technology to perform operations to facilitate learning, by a machine learning model, of how to fit the machine learning model to the retention time offset values within the first set of data for training data 702. In an example, model training facility 704 may build a non-linear regression model to fit the retention time offset values within the first set of data for training data 702.

Completion of a training phase, by model training facility 704, may result in a trained retention time offset value assignment model 706 that is configured to determine a distinct retention time offset value for each of the chromatographic features in a target file (e.g., the second subset 310 of chromatographic features for target file 302). In one example, the trained retention time offset value assignment model 706 may be stored in a data store, such as storage facility 202, and may be executed during runtime by any suitable computing component, including processing facility 204, to determine distinct retention time offset values for chromatographic features in a target file.

In certain examples, after completion of an initial training phase, which results in trained retention time offset value assignment model 706, model training facility 704 may score, in any suitable manner, trained retention time offset value assignment model 706. For example, model training facility 704 may facilitate scoring of trained retention time offset value assignment model 706 via use of the second set of data from training data 702. In an example, model training facility 704 may provide the second set of data as input to trained retention time offset value assignment model 706. Model training facility 704 may receive, as output from trained retention time offset value assignment model 706, distinct retention time offset values for chromatographic features within the second set of training data 702. Model training facility 704 may compare the retention time offset values determined by trained retention time offset value assignment model 706 to the retention time offset values (e.g., retention time offset values 602 for target file 302) determined during peak matching performed by peak matching unit 314. Based on the comparison, model training facility 704 may determine an accuracy score for trained retention time offset value assignment model 706. In an example, an accuracy score may be based on how closely the predicted retention time offset values match the identified retention time offset values. In certain examples, multiple training sessions may be performed by model training facility 704 to facilitate training of different types of machine learning models, and to generate a distinct accuracy score for each of the different machine learning models. In some examples, the different types of machine learning models may include, but are not limited to, a neural network, a Bayesian linear regression model, a Boosted Decision Tree regression model, a Decision Forest regression model, a Fast Forest Quantile regression model, a linear regression model, a neural network regression model, an ordinal regression model, and a poisson regression model.

Completion of these additional training phases, by model training facility 704, may result in a preferred or best trained retention time offset value assignment model 706 being selected as machine learning model 320. In an example, the selection of a trained retention time offset value assignment model 706 as the machine learning model 320 may be based on the distinct accuracy scores for each of the different machine learning models. For example, model training facility 704 may select the trained retention time offset value assignment model 706 with a highest accuracy score as machine learning model 320 for the associated file (e.g., target file 302). In certain examples in which multiple target files are compared with reference file 304, machine learning model 320 may be different for different target files.

Referring again to FIG. 3, upon completion of the one or more the training phases, feature subset unit 306 may provide second subset 310 of target file 302 and second subset 313 of reference file 304 as inputs to machine learning model 320, which may include one or more hidden layers. Based on the data in second subset 310 and second subset 313, machine learning model 320 may predict distinct retention time offset values for each chromatographic feature within second subset 310 of target file 302.

For example, machine learning model 320 may output predicted retention time offset data 322 for target file 302, which may include a distinct retention time offset value for each chromatographic feature within second subset 310.

System 200 may then apply the predicted retention time offset data 322 as well as the identified retention time offset data 316 as inputs to an alignment unit 324. Based on the predicted retention time offset data 322 and the retention time offset data 316, alignment unit 324 may assign retention offset values to the chromatographic features of target file 302 and output aligned target file 326. Aligned target file 326 may enable a user to perform a comparative analysis of components within both aligned target file 326 and reference file 304. For example, a user may compare the relative abundance of a component represented in aligned target file 326 with the relative abundance of the same component represented in file 304. Additionally or alternatively, system 200 may provide, for display by a display device, the aligned target file 326 and/or reference file 304, such as in the form of a feature map, a mass chromatogram, a mass spectrum, and the like.

Additionally or alternatively, system 200 may perform a chromatographic alignment for multiple other target files, each representative of a plurality of chromatographic features detected from a unique sample. In an example, if a researcher wants to compare components within the multiple target files, chromatographic alignment may be performed in a similar manner for each of the different target files in the same manner as described above for target file 302. For example, feature subset unit 306 may divide, based on a threshold value, a target file into a first set of chromatographic features and a second set of chromatographic features. Peak matching unit 314 may perform peak matching between the chromatographic features of the first subset of the target file and chromatographic features of a reference file (e.g., reference file 304) to identify retention time offset values for the chromatographic features in the first subset of the target file. These retention time offset values for the target file may be utilized as training data for a distinct machine learning model 320 for that target file. A trained machine learning model 320 may then predict retention time offset values for the chromatographic features of the second subset of the target file. The retention time offset values for all of the chromatographic features the target file may then be used to assign the retention time offset value for the chromatographic features of the target file.

Various modifications may be made to the foregoing chromatographic alignment systems and methods without departing from the scope of the present disclosure. For example, system 200 may divide target file 302 and/or reference file 304 into different subsets in any suitable way in addition to, or other than based on a threshold value as described herein. For instance, system 200 may divide target file 302 and/or reference file 304 into multiple subsets based on random selection of chromatographic features within target file 302 and/or reference file 304, organizing the chromatographic features by retention times and selecting every Nth chromatographic feature in the ordered list, etc.

As another modification, system 200 may perform peak matching for the chromatographic features of the second subset 310 of target file 302 instead of the first subset 308. In this example, based on the peaking matching of the chromatographic features of the second subset 310, identified retention times for the second subset 310 may be provided as training data to train a machine learning model. The trained machine learning model may then predict distinct retention time offset values for the chromatographic features of the first subset 308 of target file 302. Based on the predicted retention time offset data for the first subset 308 and the retention time offset data for the second subset 310, system 200 may assign retention time offset values to the chromatographic features of target file 302 based on the predicted retention time offset data 322 and the identified retention time offset data 316, and output aligned target file 326. Aligned target file 326 may enable a user to perform a comparative analysis of components within both aligned target file 326 and reference file 304.

Figure 8:
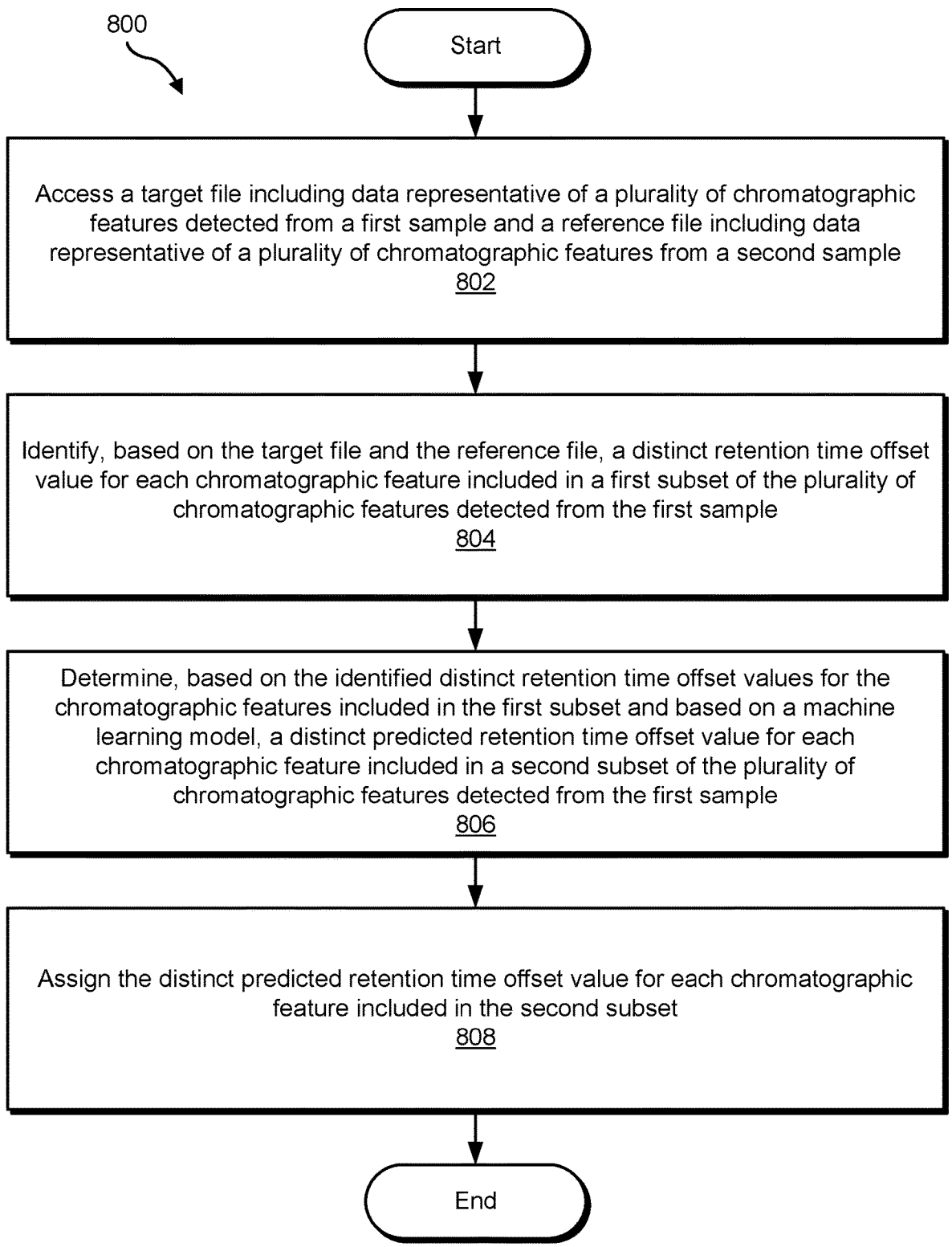
FIG. 8 illustrates an exemplary method for determining and assigning retention time offset values for chromatographic features detected for a sample according to principles described herein.

FIG. 8 illustrates an exemplary method 800 for performing chromatographic alignment. While FIG. 8 illustrates exemplary operations according to one embodiment, other embodiments may omit, add to, reorder, and/or modify any of the operations shown in FIG. 8. One or more of the operations shown in FIG. 8 may be performed by system 200, by any components included therein, and/or by any implementation thereof.

In operation 802, a target file and a reference file are accessed. Operation 802 may be performed in any of the ways described herein. The target file may include data representative of a plurality of chromatographic features detected from a first sample. The reference file may include data representative of a plurality of chromatographic features detected from a second sample.

In operation 804, based on the target file and the reference file, a distinct retention time offset value is identified for each chromatographic feature included in a first subset of the plurality of chromatographic features detected from the first sample. Operation 804 may be performed in any of the ways described herein. In one example, each chromatographic feature included in the first subset of the plurality of chromatographic features may have a relative intensity value greater than or equal to a threshold value.

In operation 806, based on the identified distinct retention time offset values for the chromatographic features included in the first subset and based on a machine learning model, a distinct predicted retention time offset value is determined for each chromatographic feature included in a second subset of the plurality of chromatographic features detected from the first sample. Operation 806 may be performed in any of the ways described herein. In one example, each chromatographic feature included in the second subset of the plurality of chromatographic features may have a relative intensity value less than the threshold value.

In operation 808, the distinct predicted retention time offset value for each chromatographic feature included in the second subset is assigned. Operation 808 may be performed in any of the ways described herein.

The chromatographic alignment systems and methods described herein improve the functionality and operation of system 200. By performing the computationally intensive peak matching only on chromatographic features in the first subset 308 of target file 302 and chromatographic features in the first subset 312 of reference file 304, the processing load on system 200 is significantly reduced. However, the retention time offset values for the chromatographic features includes in second subset 310 of target file 302 are predicted with high reliability by using a machine learning model. In this way, the robustness of peak matching may be utilized in differential profiling involving small molecules and metabolites as well as large molecules (e.g., proteins). Moreover, the reduced processing requirements enable the methods to be scaled for comparisons involving large numbers of files.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
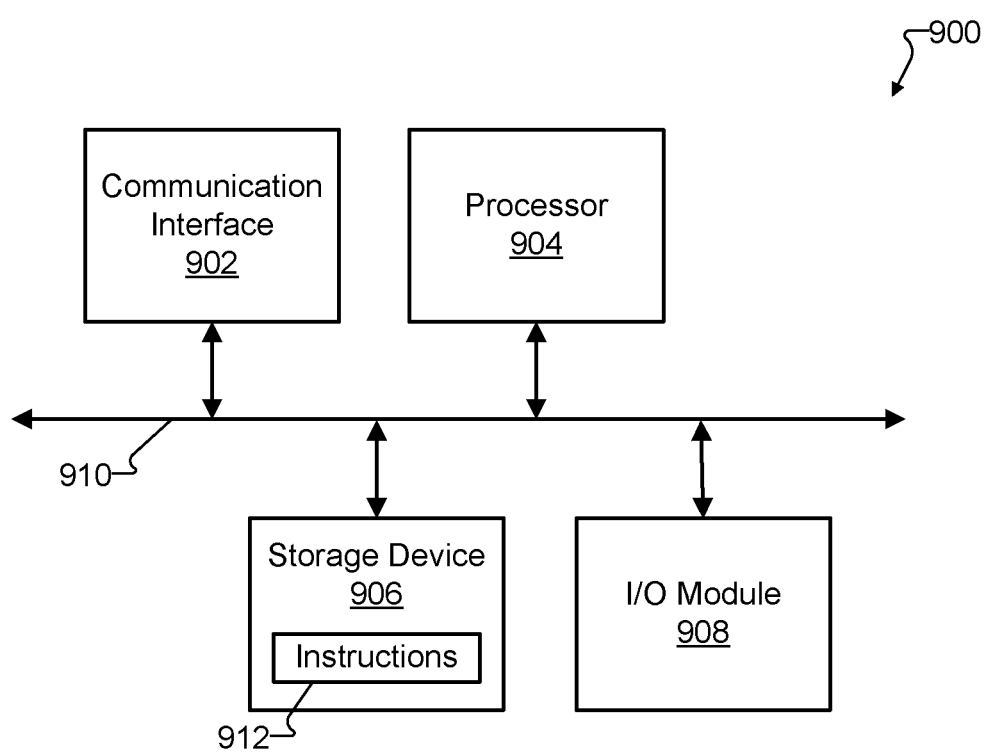
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 900. For example, storage facility 202 may be implemented by storage device 906, and processing facility 204 may be implemented by processor 904.

It will be recognized by those of ordinary skill in the art that while, in the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
accessing, by a chromatographic alignment system, a target file including data representative of a plurality of chromatographic features detected from a first sample and a reference file including data representative of a plurality of chromatographic features detected from a second sample,
identifying, by the chromatographic alignment system based on the target file and the reference file, a distinct retention time offset value for each chromatographic feature included in a first subset of the plurality of chromatographic features detected from the first sample,
determining, based on the identified distinct retention time offset values for the chromatographic features included in the first subset and based on a machine learning model, a distinct predicted retention time offset value for each chromatographic feature included in a second subset of the plurality of chromatographic features detected from the first sample, and assigning, by the chromatographic alignment system, the distinct predicted retention time offset value for each chromatographic feature included in the second subset.

2. The method of claim 1, wherein the determining of the distinct predicted retention time offset value for each chromatographic feature included in the second subset comprises applying data representative of the second subset of the plurality of chromatographic features detected from the first sample as input to a trained neural network that outputs the distinct predicted retention time offset value for each chromatographic feature included in the second subset.

3. The method of claim 1, further comprising:
during a training phase of the chromatographic alignment system
accessing, by the chromatographic alignment system, the identified distinct retention time offset value for each chromatographic feature included in the first subset, and
training, by the chromatographic alignment system, the machine learning model based on the identified distinct retention time offset value for each chromatographic feature included in the first subset.

4. The method of claim 1, wherein the identifying of the distinct retention time offset value for each chromatographic feature included in the first subset comprises:
matching, by the chromatographic alignment system, chromatographic features included in the first subset with the plurality of chromatographic features detected from the second sample, and
identifying, by the chromatographic alignment system based on the matching, the distinct retention time offset value for each chromatographic feature included in the first subset of the plurality of chromatographic features detected from the first sample.

5. The method of claim 1, further comprising:
dividing, by the chromatographic alignment system based on a threshold value, the plurality of chromatographic features detected from the first sample into the first subset and the second subset,
wherein each chromatographic feature included in the first subset has an intensity value greater than or equal to the threshold value, and
wherein each chromatographic feature included in the second subset has an intensity value less than the threshold value.

6. The method of claim 5, further comprising:
selecting, by the chromatographic alignment system based on relative intensity values for the chromatographic features included in the first subset, the threshold value.

7. The method of claim 1, further comprising:
dividing, by the chromatographic alignment system based on a random selection of chromatographic features, the plurality of chromatographic features detected from the first sample into the first subset and the second subset.

8. The method of claim 1, further comprising:
correcting, by the chromatographic alignment system based on the identified distinct retention time offset value for each chromatographic feature included in the first subset and the distinct predicted retention time offset value for each chromatographic feature included in the second subset, retention times of the plurality of chromatographic features detected from the first sample.

9. A system comprising:
at least one memory storing instructions; and
at least one processor communicatively coupled to the at least one memory and configured to execute the instructions to:
access a target file including data representative of a plurality of chromatographic features detected from a first sample and a reference file including data representative of a plurality of chromatographic features detected from a second sample,
identify, based on the target file and the reference file, a distinct retention time offset value for each chromatographic feature included in a first subset of the plurality of chromatographic features detected from the first sample,
determine, based on the identified distinct retention time offset values for the chromatographic features included in the first subset and based on a machine learning model, a distinct predicted retention time offset value for each chromatographic feature included in a second subset of the plurality of chromatographic features detected from the first sample, and
assign the distinct predicted retention time offset value for each chromatographic feature included in the second subset.

10. The system of claim 9, wherein the determination of the distinct predicted retention time offset value for each chromatographic feature included in the second subset comprises applying data representative of the second subset of the plurality of chromatographic features detected from the first sample as input to a trained neural network that outputs the distinct predicted retention time offset value for each chromatographic feature included in the second subset.

11. The system of claim 9, wherein the at least one processor is further configured to,
during a training phase of the chromatographic alignment system:
access the identified distinct retention time offset value for each chromatographic feature included in the first subset, and
train the machine learning model based on the identified distinct retention time offset value for each chromatographic feature included in the first subset.

12. The system of claim 9, wherein the identifying of the distinct retention time offset value for each chromatographic feature included in the first subset comprises,
matching chromatographic features included in the first subset with the plurality of chromatographic features detected from the second sample, and
identifying, based on the matching, the distinct retention time offset value for each chromatographic feature included in the first subset of the plurality of chromatographic features detected from the first sample.

13. The system of claim 9, wherein the at least one processor is further configured to:
divide, based on a threshold value, the plurality of chromatographic features detected from the first sample into the first subset and the second subset,
wherein each chromatographic feature included in the first subset has an intensity value greater than or equal to the threshold value, and
wherein each chromatographic feature included in the second subset has an intensity value less than the threshold value.

14. The system of claim 13, wherein the at least one processor is further configured to:

select, based on relative intensity values for the chromatographic features included in the first subset, the threshold value.

15. The system of claim 9, wherein the at least one processor is further configured to:
divide, based on a random selection of chromatographic features, the plurality of chromatographic features detected from the first sample into the first subset and the second subset.

16. The system of claim 9, wherein the at least one processor is further configured to:
correct, based on the identified distinct retention time offset value for each chromatographic feature included in the first subset and the distinct predicted retention time offset value for each chromatographic feature included in the second subset, retention times of the plurality of chromatographic features detected from the first sample.

17. A non-transitory computer-readable medium storing instructions that, when executed, direct at least one processor of a computing device to:
access a target file including data representative of a plurality of chromatographic features detected from a first sample and a reference file including data representative of a plurality of chromatographic features detected from a second sample,
identify, based on the target file and the reference file, a distinct retention time offset value for each chromatographic feature included in a first subset of the plurality of chromatographic features detected from the first sample,
determine, based on the identified distinct retention time offset values for the chromatographic features included in the first subset and based on a machine learning model, a distinct predicted retention time offset value for each chromatographic feature included in a second subset of the plurality of chromatographic features detected from the first sample, and
assign the distinct predicted retention time offset value for each chromatographic feature included in the second subset.

18. The computer-readable medium of claim 17, wherein the determination of the distinct predicted retention time offset value for each chromatographic feature included in the second subset comprises applying data representative of the second subset of the plurality of chromatographic features detected from the first sample as input to a trained neural network that outputs the distinct predicted retention time offset value for each chromatographic feature included in the second subset.

19. The computer-readable medium of claim 17, wherein, during a training phase of the system, the instructions, when executed, direct the at least one processor of the computing device to,
access the identified distinct retention time offset value for each chromatographic feature included in the first subset, and
train the machine learning model based on the identified distinct retention time offset value for each chromatographic feature included in the first subset.

20. The computer-readable medium of claim 15, wherein the identifying of the distinct retention time offset value for each of the first subset of the plurality of chromatographic features detected from the first sample comprises:
matching chromatographic features included in the first subset with the plurality of chromatographic features detected from the second sample, and
identifying, based on the matching, the distinct retention time offset value for each chromatographic feature included in the first subset of the plurality of chromatographic features detected from the first sample.

* * * * *

UNITED STATES PATENT AND TRADEMARK OFFICE
CERTIFICATE OF CORRECTION

| | | |
|---|---|---|
| PATENT NO. | : 11,454,617 B2 | Page 1 of 1 |
| APPLICATION NO. | : 16/263249 | |
| DATED | : September 27, 2022 | |
| INVENTOR(S) | : Iman Mohtashemi et al. | |

It is certified that error appears in the above-identified patent and that said Letters Patent is hereby corrected as shown below:

In the Claims

In Column 19, Claim 3, Line 17, delete "system" and insert -- system: --, therefor.

In Column 20, Claim 11, Line 36, delete "to," and insert -- to: --, therefor.

In Column 20, Claim 12, Line 47, delete "comprises," and insert -- comprises: --, therefor.

In Column 22, Claim 18, Line 6, delete "The computer-readable" and insert -- The non-transitory computer-readable --, therefor.

In Column 22, Claim 19, Line 15, delete "The computer-readable" and insert -- The non-transitory computer-readable --, therefor.

In Column 22, Claim 19, Line 18, delete "to," and insert -- to: --, therefor.

In Column 22, Claim 20, Line 25, delete "The computer-readable medium of" and insert -- The system of --, therefor.

Signed and Sealed this
Eighth Day of November, 2022

*Katherine Kelly Vidal*

Katherine Kelly Vidal
*Director of the United States Patent and Trademark Office*